United States Patent
Nakashima et al.

(10) Patent No.: US 11,002,292 B2
(45) Date of Patent: May 11, 2021

(54) PROPELLER FAN AND REFRIGERATION CYCLE DEVICE

(71) Applicant: Mitsubishi Electric Corporation, Tokyo (JP)

(72) Inventors: Seiji Nakashima, Tokyo (JP); Yasuaki Kato, Tokyo (JP); Wahei Shingu, Tokyo (JP); Hiroaki Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 16/329,369

(22) PCT Filed: Nov. 18, 2016

(86) PCT No.: PCT/JP2016/084249
§ 371 (c)(1),
(2) Date: Feb. 28, 2019

(87) PCT Pub. No.: WO2018/092262
PCT Pub. Date: May 24, 2018

(65) Prior Publication Data
US 2019/0277308 A1    Sep. 12, 2019

(51) Int. Cl.
*F04D 29/38*    (2006.01)
*F04D 29/66*    (2006.01)
*F25B 39/04*    (2006.01)

(52) U.S. Cl.
CPC ........... *F04D 29/66* (2013.01); *F04D 29/384* (2013.01); *F04D 29/667* (2013.01); *F25B 39/04* (2013.01);

(Continued)

(58) Field of Classification Search
CPC ...... F04D 29/384; F04D 29/38; F04D 29/386; F04D 29/388; F04D 29/667; F04D 29/324
See application file for complete search history.

(56) References Cited

U.S. PATENT DOCUMENTS

| 102,399 A | * | 4/1870 | Hirsch | F04D 29/384 416/238 |
| 1,473,066 A | * | 11/1923 | Wells | F04D 29/384 416/235 |

(Continued)

FOREIGN PATENT DOCUMENTS

| GB | 758466 A | * 10/1956 | ........... F04D 29/384 |
| JP | H08-028497 A | 1/1996 | |

(Continued)

OTHER PUBLICATIONS

JP2005016457—Translation (Year: 2005).*

(Continued)

*Primary Examiner* — Brian P Wolcott
*Assistant Examiner* — Behnoush Haghighian
(74) *Attorney, Agent, or Firm* — Posz Law Group, PLC

(57) ABSTRACT

A propeller fan includes a boss and a blade. The boss rotates about an axis. The blade is provided at an outer periphery of the boss. The blade has a first region in a radial direction. In the first region, a blade chord center line shifts downstream toward an outer peripheral side. In a cylindrical cross section about an axis, a cross-sectional shape of the blade at least in the first region is an airfoil shape. When a cross section taken along the blade chord center line and projected onto a plane including the axis is viewed, the blade chord center line is a curve having a convex on a downstream side in an entire region in the radial direction.

6 Claims, 8 Drawing Sheets

(52) U.S. Cl.
CPC .... *F05D 2240/301* (2013.01); *F25B 2500/12* (2013.01)

(56) References Cited

U.S. PATENT DOCUMENTS

| | | | | |
|---|---|---|---|---|
| 1,821,484 | A * | 9/1931 | Spencer | F04D 29/384 |
| | | | | 416/202 |
| 2,043,736 | A * | 6/1936 | Charavay | F04D 29/386 |
| | | | | 416/238 |
| 2,090,888 | A * | 8/1937 | Wainwright | F04D 29/384 |
| | | | | 416/243 |
| 2,157,999 | A * | 5/1939 | Charavay | F04D 29/384 |
| | | | | 416/242 |
| 2,269,287 | A * | 1/1942 | Roberts | 416/238 |
| 2,276,262 | A * | 3/1942 | Caldwell | 416/226 |
| 5,181,830 | A * | 1/1993 | Chou | F04D 29/384 |
| | | | | 416/223 R |
| 5,190,441 | A * | 3/1993 | Murphy | F02K 3/072 |
| | | | | 416/129 |
| 9,067,477 | B2 * | 6/2015 | Onimaru | B60L 53/14 |
| 9,150,080 | B2 * | 10/2015 | Kamada | B60H 1/00278 |
| 9,394,911 | B2 * | 7/2016 | Nakashima | F04D 19/002 |
| 9,796,398 | B2 * | 10/2017 | Mizobata | F25B 13/00 |
| 2013/0101420 | A1 * | 4/2013 | Nakashima | F04D 29/384 |
| | | | | 416/204 R |
| 2013/0323098 | A1 | 12/2013 | Ooya et al. | |
| 2014/0246180 | A1 * | 9/2014 | Nakashima | F04D 25/166 |
| | | | | 165/121 |
| 2014/0352338 | A1 * | 12/2014 | Mizobata | F25B 41/046 |
| | | | | 62/160 |
| 2015/0369546 | A1 | 12/2015 | Nakashima et al. | |
| 2016/0116197 | A1 * | 4/2016 | Takeuchi | F25B 5/04 |
| | | | | 62/276 |

FOREIGN PATENT DOCUMENTS

| | | | | |
|---|---|---|---|---|
| JP | 2005-016457 | A | | 1/2005 |
| JP | 2005016457 | A * | 1/2005 | ........ F04D 29/384 |
| JP | 2011-169285 | A | | 9/2011 |
| JP | 2013-249763 | A | | 12/2013 |
| WO | 2011/141964 | A1 | | 11/2011 |
| WO | 2014/125710 | A1 | | 8/2014 |

OTHER PUBLICATIONS

International Search Report of the International Searching Authority dated Feb. 7, 2017 for the corresponding international application No. PCT/JP2016/084249 (and English translation).

* cited by examiner

PROPELLER FAN AND REFRIGERATION CYCLE DEVICE

CROSS REFERENCE TO RELATED APPLICATION

This application is a U.S. national stage application of PCT/JP2016/084249 filed on Nov. 18, 2016, the contents of which are incorporated herein by reference.

TECHNICAL FIELD

The present invention relates to a propeller fan that is used in a refrigeration cycle device, such as an air-conditioning device and a ventilation device, and a refrigeration cycle device including the propeller fan.

BACKGROUND ART

A low-noise propeller fan (axial-flow air-sending device) has been desired. For this reason, various propeller fans designed to reduce noise by the shape of each blade have been proposed.

For example, Patent Literature 1 describes an axial-flow air-sending device. The axial-flow air-sending device includes an electric motor and an air-sending fan. The air-sending fan has a hub and a plurality of blades. The hub is connected to the electric motor. A plurality of blades is provided radially on the hub. Each of the blades has a suction surface and a pressure surface. The suction surface at a leading edge of each blade has a plurality of triangular protrusions having vertices along the leading edge. The pressure surface at the leading edge of each blade has a smooth continuous surface having no triangular protrusions.

CITATION LIST

Patent Literature

Patent Literature 1: Japanese Unexamined Patent Application Publication No. 2013-249763

SUMMARY OF INVENTION

Technical Problem

In the technique described in Patent Literature 1, although the cross section of each blade has an airfoil shape, it is not a sufficient blade shape design made with consideration given to flow of a blade tip vortex that is generated at the blade outer peripheral end. Therefore, there is a problem that fluctuations in the blade tip vortex are increased and, as a result, noise is not reduced.

The present invention has been made to solve the above problem, and an object thereof is to provide a propeller fan that reduces noise by employing a blade shape with consideration given to flow of a blade tip vortex that is generated at a blade outer peripheral end, and a refrigeration cycle device including the propeller fan.

Solution to Problem

A propeller fan of one embodiment of the present invention includes a boss and a blade. The boss rotates about an axis. The blade is provided at an outer periphery of the boss. The blade has a first region in a radial direction. In the first region, a blade chord center line shifts downstream toward an outer peripheral side. In a cylindrical cross section about the axis, a cross-sectional shape of the blade at least in the first region is an airfoil shape. When viewing a cross section taken along the blade chord center line and projected onto a plane including the axis, the blade chord center line is a curve having a convex on a downstream side in an entire region in the radial direction.

A refrigeration cycle device of another embodiment of the present invention includes a refrigerant circuit in which a compressor, a first heat exchanger, an expansion device, and a second heat exchanger are connected by pipes. The above-described propeller fan is installed in a cooling unit in conjunction with the first heat exchanger, and supplies air to the first heat exchanger.

Advantageous Effects of Invention

With the propeller fan of one embodiment of the present invention, the propeller fan includes the blade configured such that, in the cylindrical cross section about the axis, the cross-sectional shape is an airfoil shape at least in the region in which the blade chord center line shifts downstream toward the outer peripheral side (first region) and, when viewing the cross section taken along the blade chord center line and projected onto the plane including the axis, the blade chord center line is a curve having a convex on a downstream side in the entire region in the radial direction. Therefore, air flow blowing out from the blade spreads in the radial direction. This reduces stagnation of flow downstream of the boss to reduce a boss downstream vortex, and an outer peripheral end of the blade has a shape along flow causing a blade tip vortex. For this reason, with the propeller fan of one embodiment of the present invention, it is possible to reduce fluctuations in vortex by stabilizing the blade tip vortex, and exercise the effect of reducing turbulence resulting from the airfoil shape in the cross section of the blade, so noise is reduced.

With the refrigeration cycle device of another embodiment of the present invention, since the above-described propeller fan is provided in the cooling unit in conjunction with the first heat exchanger, noise is reduced.

DESCRIPTION OF EMBODIMENTS

Hereinafter, embodiments of the present invention will be described with reference to the drawings. In the following drawings including FIG. 1, the magnitude relations among components can be different from the actual ones. In the following drawings including FIG. 1, the same reference signs denote the same or corresponding components, and this applies to the entire text of the specification. The modes of elements described in the entire text of the specification are only illustrative, and hence should not be construed as limiting the scope of the invention.

Embodiment 1

Figure 1:
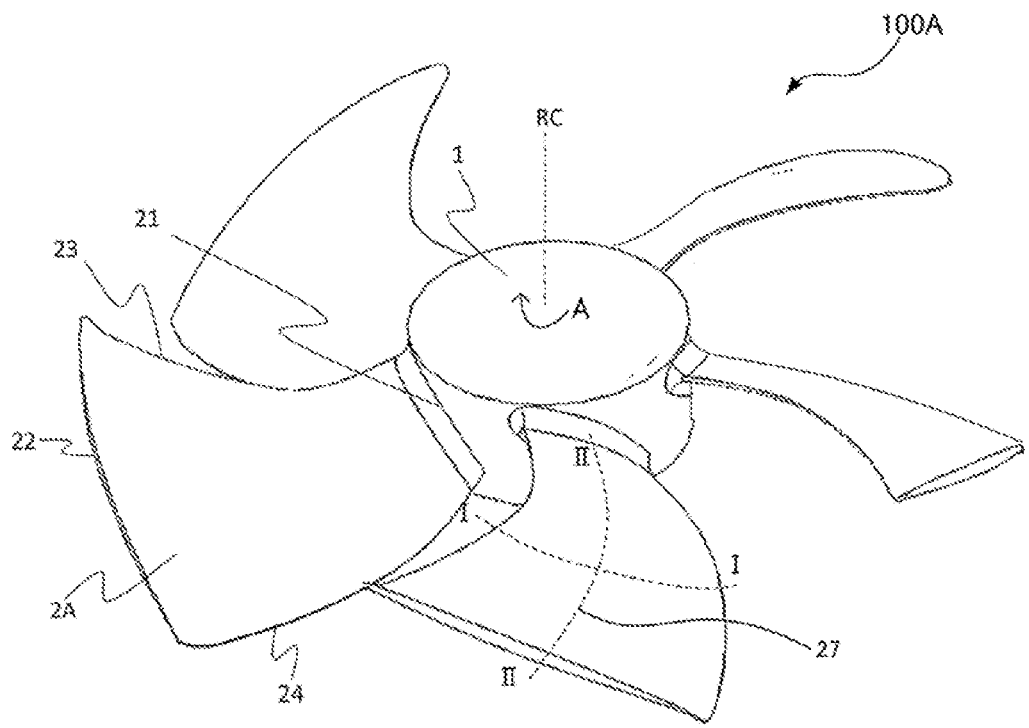
FIG. 1 is a perspective view of a propeller fan according to Embodiment 1 of the present invention.
Figure 2:
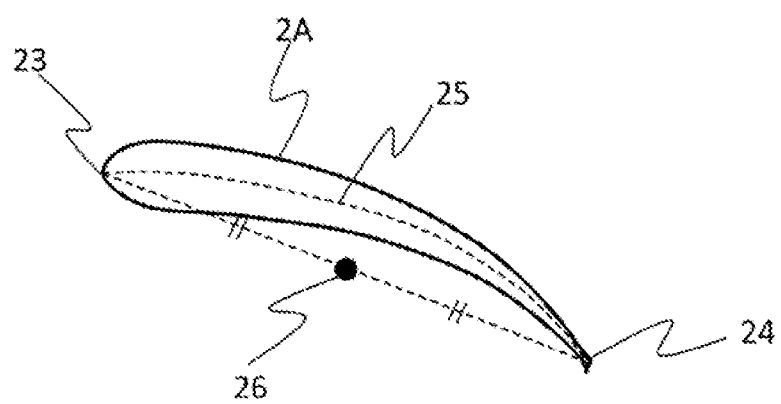
FIG. 2 is a cross-sectional view of the propeller fan according to Embodiment 1 of the present invention, taken along the line I-I in FIG. 1.
Figure 3:
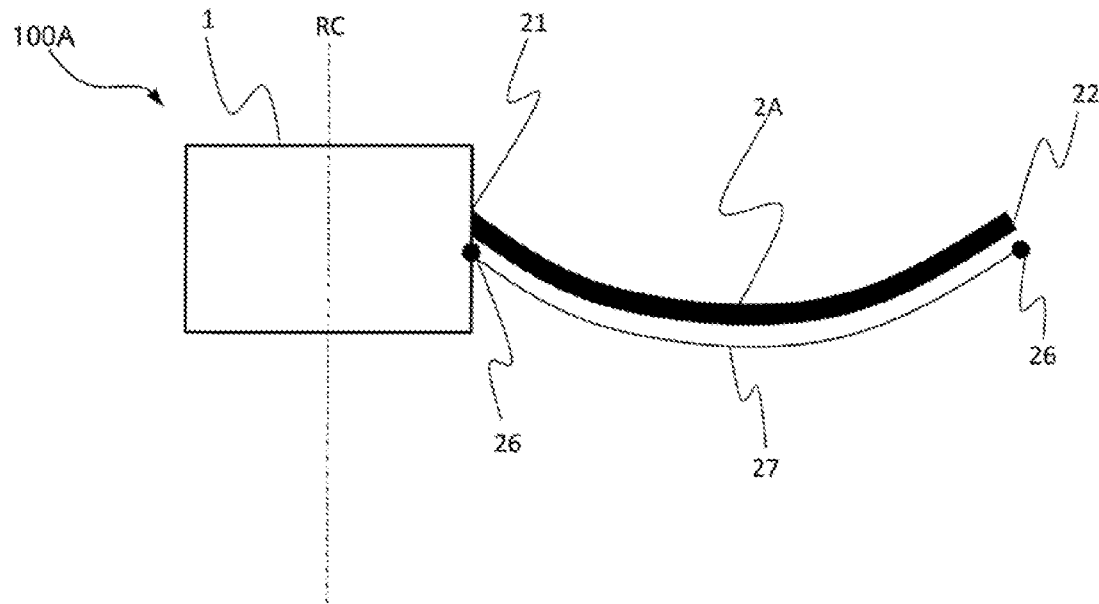
FIG. 3 is a projection view obtained by projecting a cross section of the propeller fan according to Embodiment 1 of the present invention, taken along the line II-II in FIG. 1, onto a plane including an axis of the propeller fan.

FIG. 1 is a perspective view of a propeller fan 100A according to Embodiment 1 of the present invention. FIG. 2 is a cross-sectional view of the propeller fan 100A, taken along the line I-I in FIG. 1. FIG. 3 is a projection view obtained by projecting a cross section of the propeller fan 100A, taken along the line II-II in FIG. 1, onto a plane including an axis of the propeller fan 100A. The propeller fan 100A will be described with reference to FIG. 1 to FIG. 3. The cross section taken along the line II-II depicts a cross section of the propeller fan 100A, taken along a blade chord center line 27.

As for reference signs of a plurality of portions, such as blades 2A of the propeller fan 100A, only one representative portion is indicated by a reference sign. Portions indicated by reference signs will be mainly described, and the description of portions not indicated by reference signs is omitted. FIG. 1 shows the propeller fan 100A having the five blades 2A as an example; however, the number of the blades 2A is not limited to the number shown in the drawing.

The propeller fan 100A includes a boss 1 and the plurality of blades 2A. The boss 1 rotates about an axis RC. The plurality of blades 2A is provided at an outer periphery of the boss 1. Each blade 2A is surrounded by an inner peripheral end 21, an outer peripheral end 22, a leading edge 23, and a trailing edge 24. A cross-sectional shape in the entire region of the blade 2A in a cylindrical cross section about the axis RC is an airfoil shape as shown in FIG. 2 as the cross section taken along the line I-I.

As shown in FIG. 2, a midpoint of a straight line connecting the leading edge 23 and trailing edge 24 of a camber line 25 of the blade 2A in the cylindrical cross section about the axis RC is defined as blade chord center point 26. As shown in FIG. 3, a curve connecting the blade chord center points 26 from the inner peripheral end 21 to the outer peripheral end 22 is defined as blade chord center line 27. Each blade 2A of the propeller fan 100A is configured such that, when viewing a cross section of the blade 2A, which is taken along the blade chord center line 27 and projected onto a plane including the axis, the blade chord center line 27 is a curve having a convex on a downstream side in the entire region in a radial direction.

The operation of the propeller fan 100A will be simply described.

As a motor (not shown) connected to the boss 1 is driven to rotate, the blades 2A having the three-dimensional shape shown in FIG. 1 rotate in an arrow A direction about the axis RC together with the boss 1. Air flow (air-sending flow) from the upper side toward the lower side in the drawing is generated by the rotation of the blades 2A. An upstream of each blade 2A serves as a suction surface, and a downstream of each blade 2A serves as a pressure surface.

Figure 4:
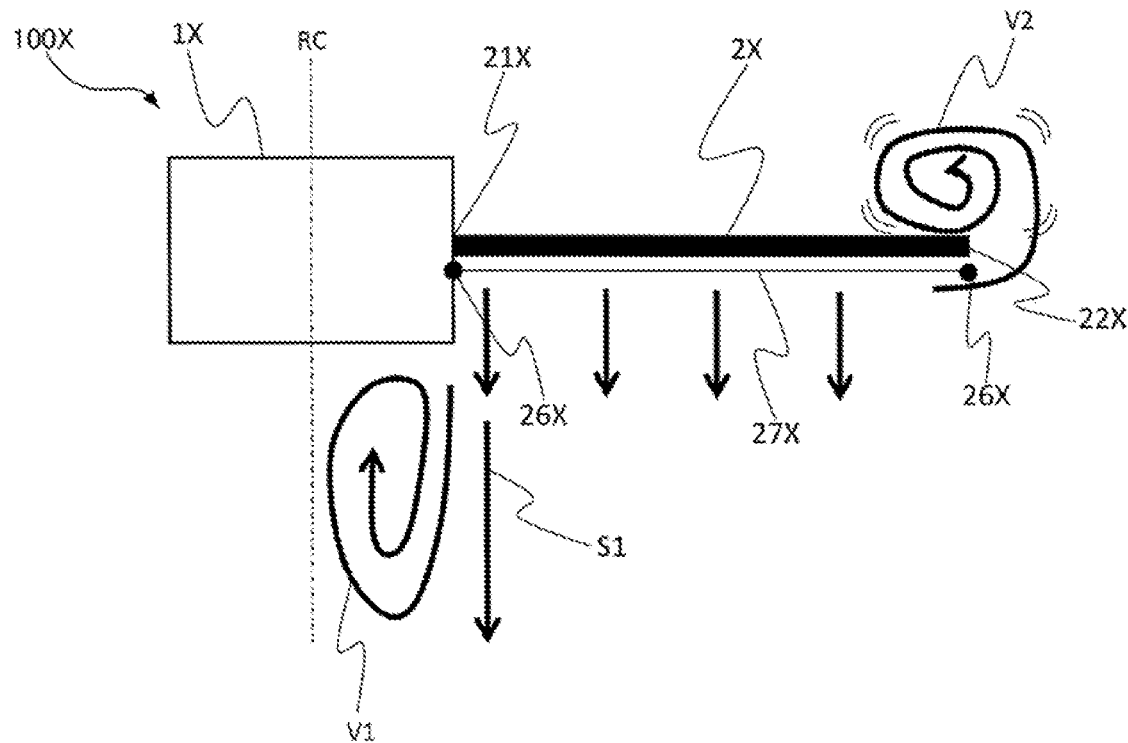
FIG. 4 is a projection view that schematically shows flow of air caused by an existing propeller fan, and that is obtained by projecting a cross section of the existing propeller fan, taken along a blade chord center line, onto a plane including an axis of the propeller fan.
Figure 5:
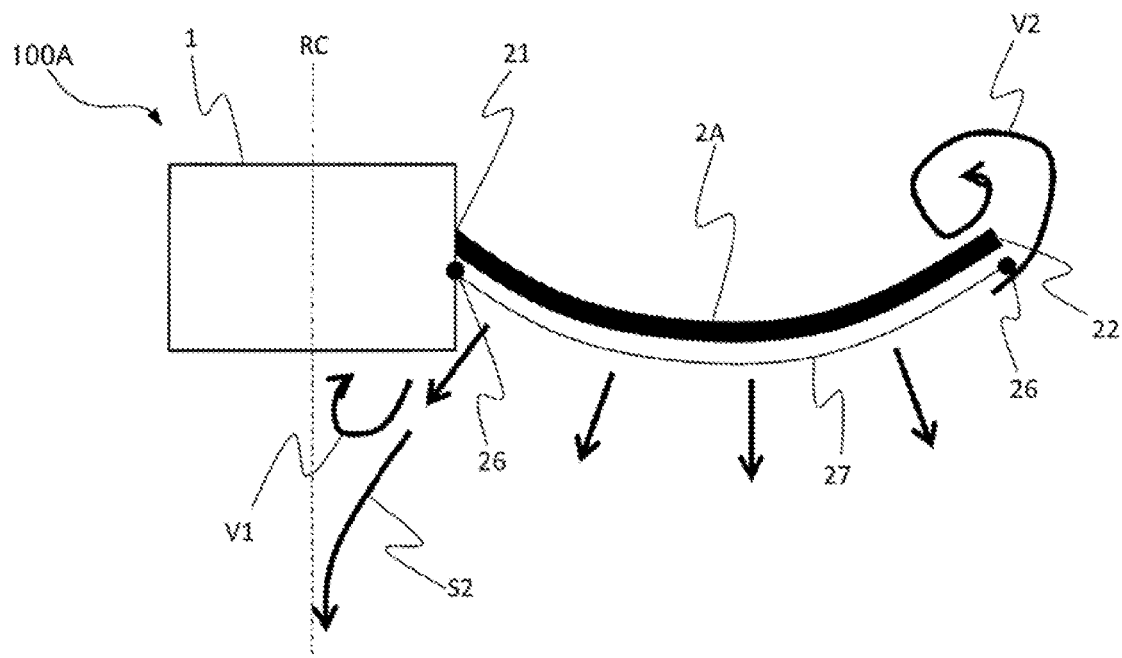
FIG. 5 is a projection view that schematically shows flow of air caused by the propeller fan according to Embodiment 1 of the present invention, and that is obtained by projecting a cross section of the propeller fan, taken along a blade chord center line, onto the plane including the axis of the propeller fan.

Advantageous effects of the propeller fan 100A will be described with reference to FIG. 4 and FIG. 5. FIG. 4 is a projection view that schematically shows flow of air caused by an existing propeller fan 100X, and that is obtained by projecting a cross section of the propeller fan 100X, taken along a blade chord center line 27X, onto a plane including an axis of the propeller fan 100X. FIG. 5 is a projection view that schematically shows flow of air caused by the propeller fan 100A, and that is obtained by projecting the cross section of the propeller fan 100A, taken along the blade chord center line 27, onto the plane including the axis of the propeller fan 100A. FIG. 4 shows the existing propeller fan 100X with "X" being suffixed to reference signs.

As shown in FIG. 4, the propeller fan 100X has the blade chord center line 27X that is not a curve having a convex on a downstream side, and air flow S1 blowing out from each blade 2X is linear. This leads to stagnation of flow downstream of the boss 1X, thereby to develop a boss downstream vortex V1, and also develop a blade tip vortex V2 at an outer peripheral end 22X of the blade 2X. For this reason, the propeller fan 100X causes large fluctuations in flow, and eliminates the effect of reducing turbulence resulting from the airfoil shape in the cross section of the blade 2X. That is, the propeller fan 100X not only cannot achieve efficient noise reduction but also reduces fan efficiency.

In contrast, as shown in FIG. 5, the blade chord center line 27 of the propeller fan 100A is a curve having a convex on a downstream side in the entire region in the radial direction, so air flow S2 blowing out from each blade 2A spreads in the radial direction. This reduces stagnation of flow downstream of the boss 1 to reduce the boss downstream vortex V1, and the outer peripheral end 22 of the blade 2A has a shape along flow causing the blade tip vortex V2. For this reason, the propeller fan 100A reduces fluctuations in vortex by stabilizing the blade tip vortex V2, and maximizes the effect of reducing turbulence resulting from the airfoil shape in the cross section of each blade 2A, so noise is reduced.

Embodiment 2

Figure 6:
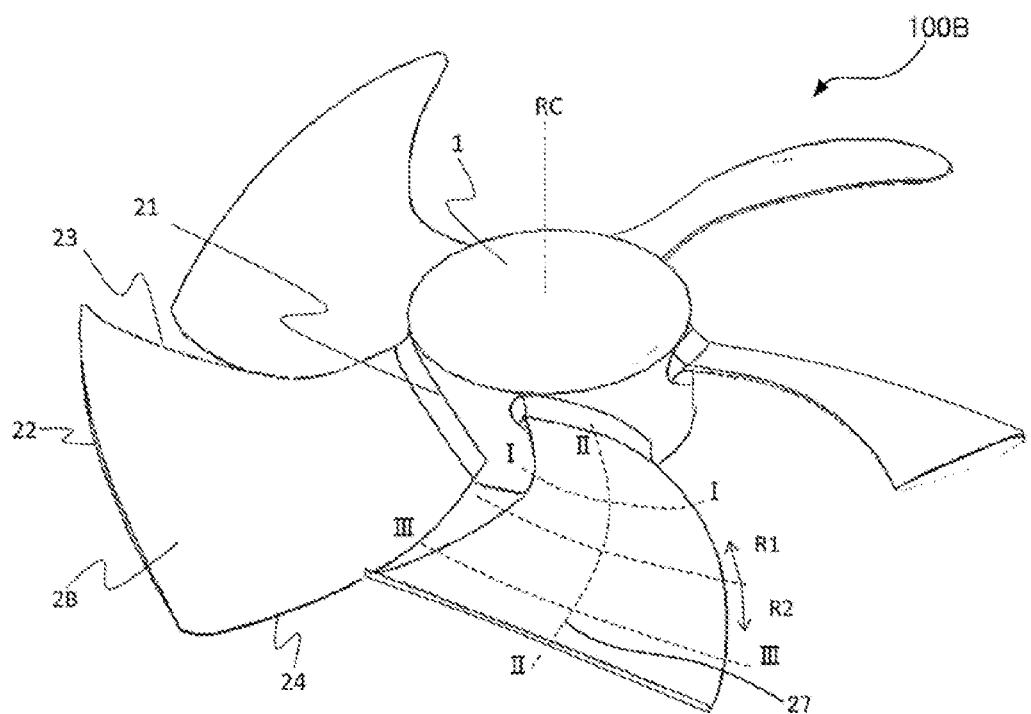
FIG. 6 is a perspective view of a propeller fan according to Embodiment 2 of the present invention.
Figure 7:
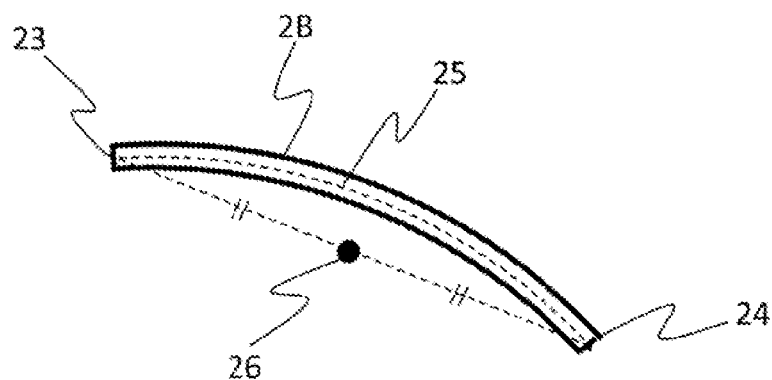
FIG. 7 is a cross-sectional view of the propeller fan according to Embodiment 2 of the present invention, taken along the line III-III in FIG. 6.
Figure 8:
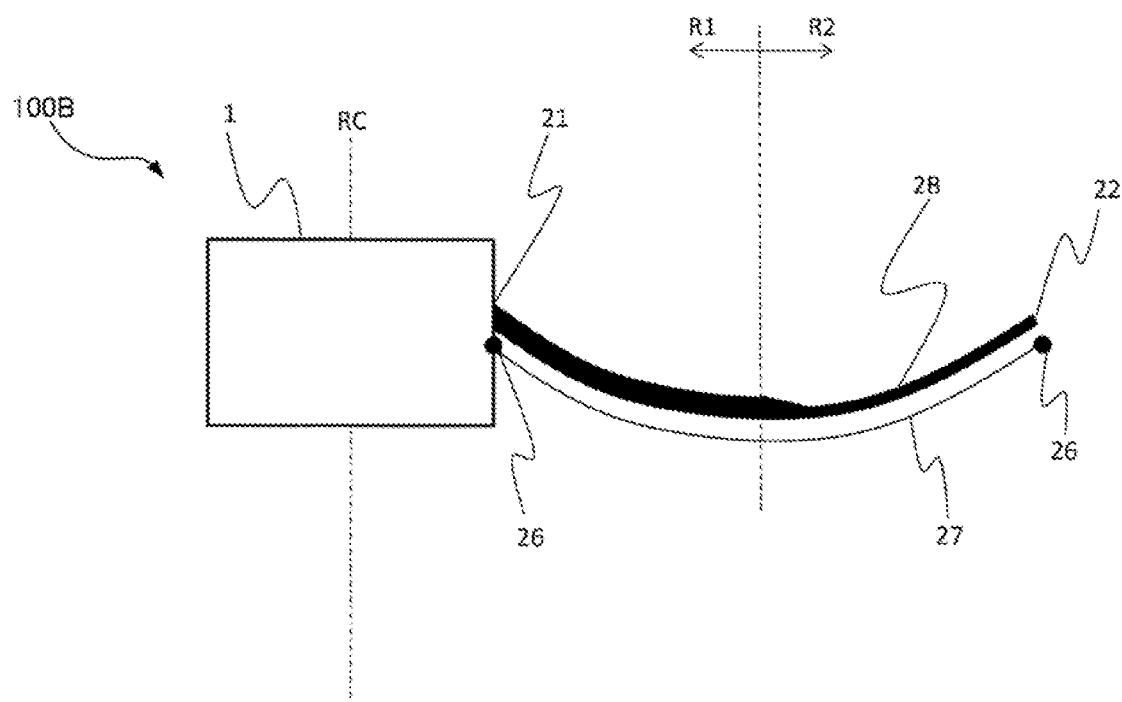
FIG. 8 is a projection view obtained by projecting a cross section of the propeller fan according to Embodiment 2 of the present invention, taken along the line II-II in FIG. 6, onto a plane including an axis of the propeller fan.

FIG. 6 is a perspective view of a propeller fan 100B according to Embodiment 2 of the present invention. FIG. 7 is a cross-sectional view of the propeller fan 100B, taken along the line III-III in FIG. 6. FIG. 8 is a projection view obtained by projecting a cross section of the propeller fan 100B, taken along the line II-II in FIG. 6, onto a plane including an axis of the propeller fan 100B. The propeller fan 100B will be described with reference to FIG. 6 to FIG. 8. The cross section taken along the line II-II depicts a cross section of the propeller fan 100B, taken along the blade chord center line 27.

In Embodiment 2, a difference from Embodiment 1 will be mainly described, the same reference signs denote the same portions as those of Embodiment 1, and the description thereof is omitted.

In Embodiment 2, each blade 2B of the propeller fan 100B differs from each blade 2A of the propeller fan 100A in Embodiment 1.

As for reference signs of a plurality of portions, such as the blades 2B of the propeller fan 100B, only one representative portion is indicated by a reference sign. Portions indicated by reference signs will be mainly described, and the description of portions not indicated by reference signs is omitted. FIG. 6 shows the propeller fan 100B having the five blades 2B as an example; however, the number of the blades 2B is not limited to the number shown in the drawing.

A region in which the blade chord center line 27 shifts downstream toward the outer peripheral end 22 is defined as first region R1, and a region in which the blade chord center line 27 shifts upstream toward the outer peripheral end 22 is defined as second region R2. In the first region R1, a cross-sectional shape of each blade 2B in a cylindrical cross section about the axis RC is an airfoil shape as shown in FIG. 2 and described in Embodiment 1. On the other hand, in the second region R2, a cross-sectional shape of each blade 2B in the cylindrical cross section about the axis RC is a circular arc shape having substantially constant thickness from the leading edge 23 toward the trailing edge 24 as shown in FIG. 7 as the cross section taken along the line III-III. The first region R1 and the second region R2 smoothly connect with each other. The boundary between the first region R1 and the second region R2 just needs to fall within a predetermined range including a middle portion of the blade 2B, and does not need to be specifically set.

Figure 9:
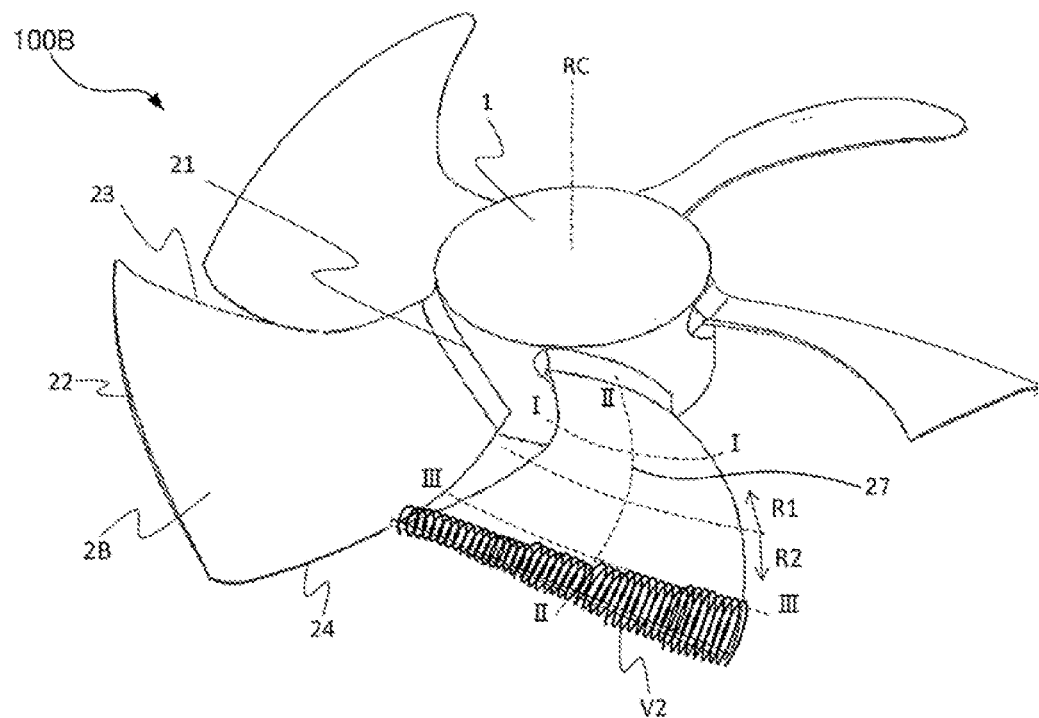
FIG. 9 is a schematic view that schematically shows flow of air that is generated by the propeller fan according to Embodiment 2 of the present invention.

Advantageous effects of the propeller fan 100B will be described with reference to FIG. 9. FIG. 9 is a schematic view that schematically shows flow of air caused by the propeller fan 100B.

As shown in FIG. 9, the blade tip vortex V2 develops along the outer peripheral end 22 of each blade 2B from the leading edge 23 of the blade 2B to the trailing edge 24 of the blade 2B. In the propeller fan 100B, the cross-sectional shape of each blade 2B in the cylindrical cross section about the axis RC is a circular arc shape having a substantially constant thickness from the leading edge 23 to the trailing edge 24 in the second region R2. This reduces fluctuations in the blade tip vortex V2 in process of developing from the leading edge 23 to the trailing edge 24, so noise reduction is achieved.

Embodiment 3

Figure 10:
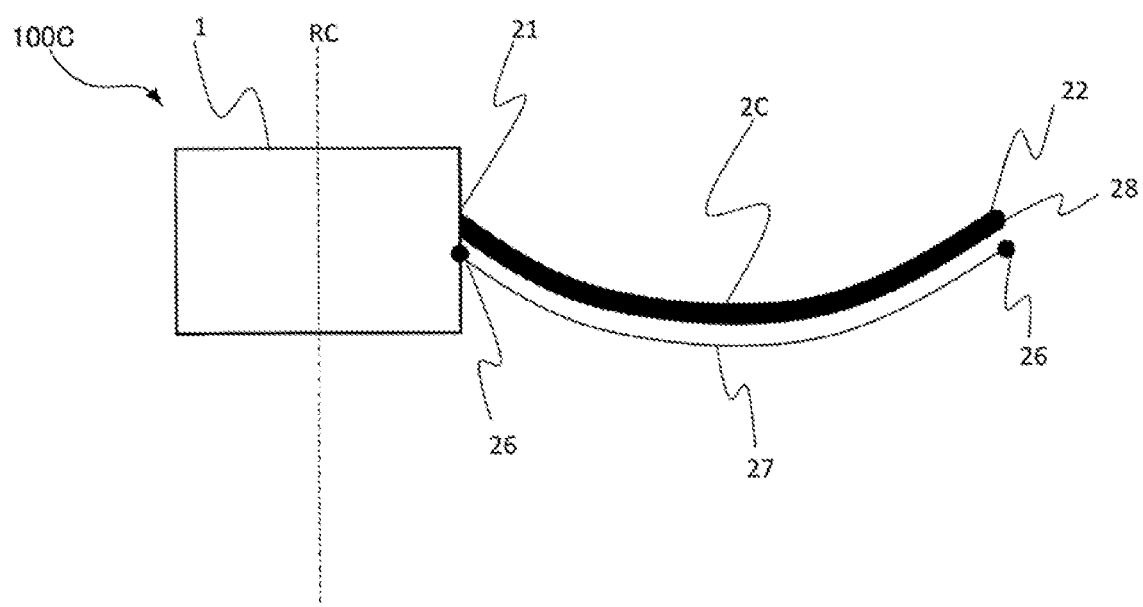
FIG. 10 is a projection view obtained by projecting a cross section of a propeller fan according to Embodiment 3 of the present invention, taken along a blade chord center line, onto a plane including an axis of the propeller fan.

FIG. 10 is a projection view that is obtained by projecting a cross section of a propeller fan 100C according to Embodiment 3 of the present invention, taken along the blade chord center line 27, onto a plane including an axis of the propeller fan 100C. The propeller fan 100C will be described with reference to FIG. 10. FIG. 10 corresponds to a projection view that is obtained by projecting the cross section of the propeller fan, shown in FIG. 3, or the cross section of the propeller fan, shown in FIG. 8, taken along the line II-II, onto the plane including the axis.

In Embodiment 3, a difference from Embodiment 1 or Embodiment 2 will be mainly described, the same reference signs denote the same portions as those in Embodiment 1 or Embodiment 2, and the description thereof is omitted.

In Embodiment 3, each blade 2C of the propeller fan 100C differs from each blade 2A of the propeller fan 100A in Embodiment 1 or each blade 2B of the propeller fan 100B in Embodiment 2.

As for reference signs of a plurality of portions, such as the blades 2C of the propeller fan 100C, only one representative portion is indicated by a reference sign. Portions indicated by reference signs will be mainly described, and the description of portions not indicated by reference signs is omitted.

As shown in FIG. 10, each blade 2C has a rounded portion 28 provided at a downstream end of the blade 2C at a side closer to the outer peripheral end 22. That is, each blade 2C has a shape that is further effectively formed along flow causing the outer peripheral end 22 of the blade 2C to generate a blade tip vortex V2. For this reason, the propeller fan 100C reduces fluctuations in vortex by further stabilizing the blade tip vortex V2 and maximally exercises the effect of reducing turbulence resulting from the airfoil shape in the cross section of the blade 2C, so noise is reduced.

The rounded portion 28 may be applied to each blade 2B of the propeller fan 100B in Embodiment 2.

Embodiment 4

Figure 11:
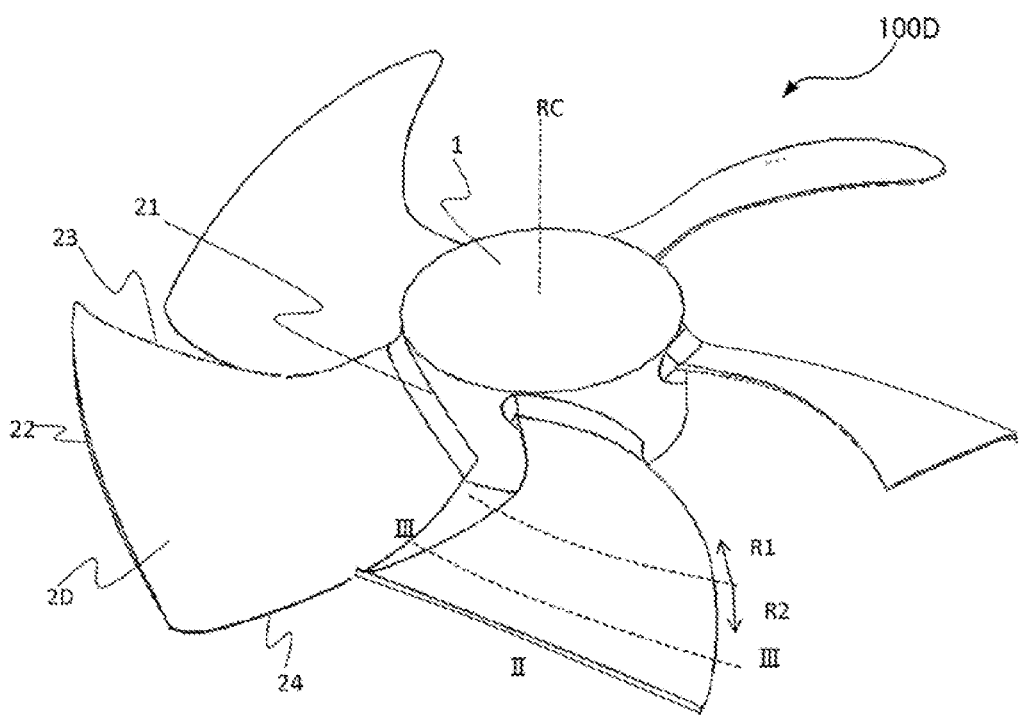
FIG. 11 is a perspective view of a propeller fan according to Embodiment 4 of the present invention.
Figure 12:
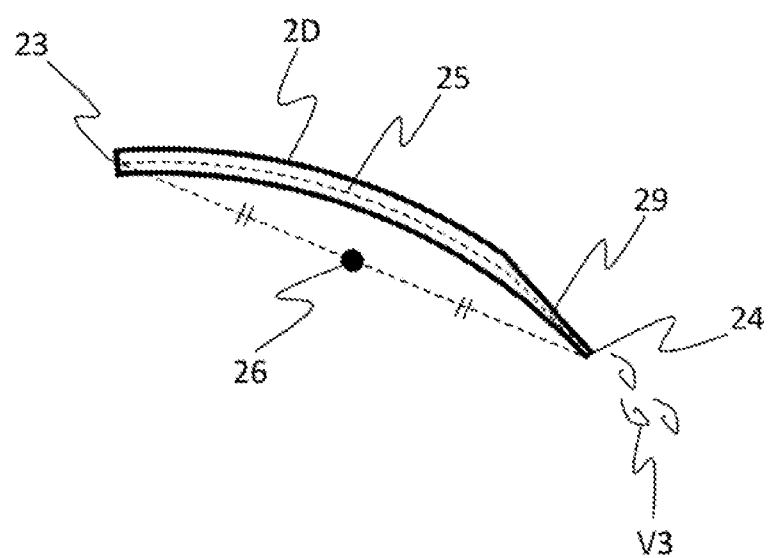
FIG. 12 is a cross-sectional view of the propeller fan according to Embodiment 4 of the present invention, taken along the line III-III in FIG. 11.

FIG. 11 is a perspective view of a propeller fan 100D according to Embodiment 4 of the present invention. FIG. 12 is a cross-sectional view of the propeller fan 100D, taken along the line III-III in FIG. 11. The propeller fan 100D will be described with reference to FIG. 11 and FIG. 12.

In Embodiment 4, a difference from Embodiment 1, Embodiment 2, or Embodiment 3 will be mainly described, like reference signs denote the same portions as those in Embodiment 1, Embodiment 2, or Embodiment 3, and the description thereof is omitted.

In Embodiment 4, each blade 2D of the propeller fan 100D differs from each blade 2A of the propeller fan 100A in Embodiment 1, each blade 2B of the propeller fan 100B in Embodiment 2, or each blade 2C of the propeller fan 100C in Embodiment 3.

As for reference signs of a plurality of portions, such as the blades 2D of the propeller fan 100D, only one representative portion is indicated by a reference sign. Portions indicated by reference signs will be mainly described, and the description of portions not indicated by reference signs is omitted. FIG. 11 shows the propeller fan 100D having the five blades 2D as an example; however, the number of the blades 2D is not limited to the number shown in the drawing.

As shown in FIG. 12, each blade 2D has a thin-walled portion 29 formed by thinning the trailing edge 24 of the blade 2D in the second region. That is, each blade 2D has a locally thinned portion at the trailing edge 24 in the second region. The thin-walled portion 29 smoothly connects with the other portion, and gradually reduces its weight toward the trailing edge 24. For this reason, the propeller fan 100D reduces fluctuations in blade tip vortex V2 because of constant blade thickness near the leading edge 23 of each blade 2D, and reduces generation of a trailing edge release vortex V3 because of the provision of the thin-walled portion 29 near the trailing edge 24 of each blade 2D. Therefore, the propeller fan 100D reduces interference between the blade tip vortex V2 and the trailing edge release vortex V3. Thus, the propeller fan 100D reduces fluctuations in vortex by further stabilizing the blade tip vortex V2, so noise reduction can be achieved.

The rounded portion 28 described in Embodiment 3 may be applied to each blade 2D.

In Embodiment 1 to Embodiment 4, an example in which the blade chord center line 27 is a curve having a convex on a downstream side in the entire region in the radial direction and each of the blades 2A to blades 2D themselves is formed in a curve having a convex on a downstream side in the entire region in the radial direction is shown. Even when the blade chord center line 27 is a curve having a convex on a downstream side in the entire region in the radial direction, each of the blades 2A to blades 2D themselves is not always formed in a curve having a convex on a downstream side in the entire region in the radial direction. In this case as well, advantageous effects of the present invention can be obtained.

Embodiment 5

Figure 13:
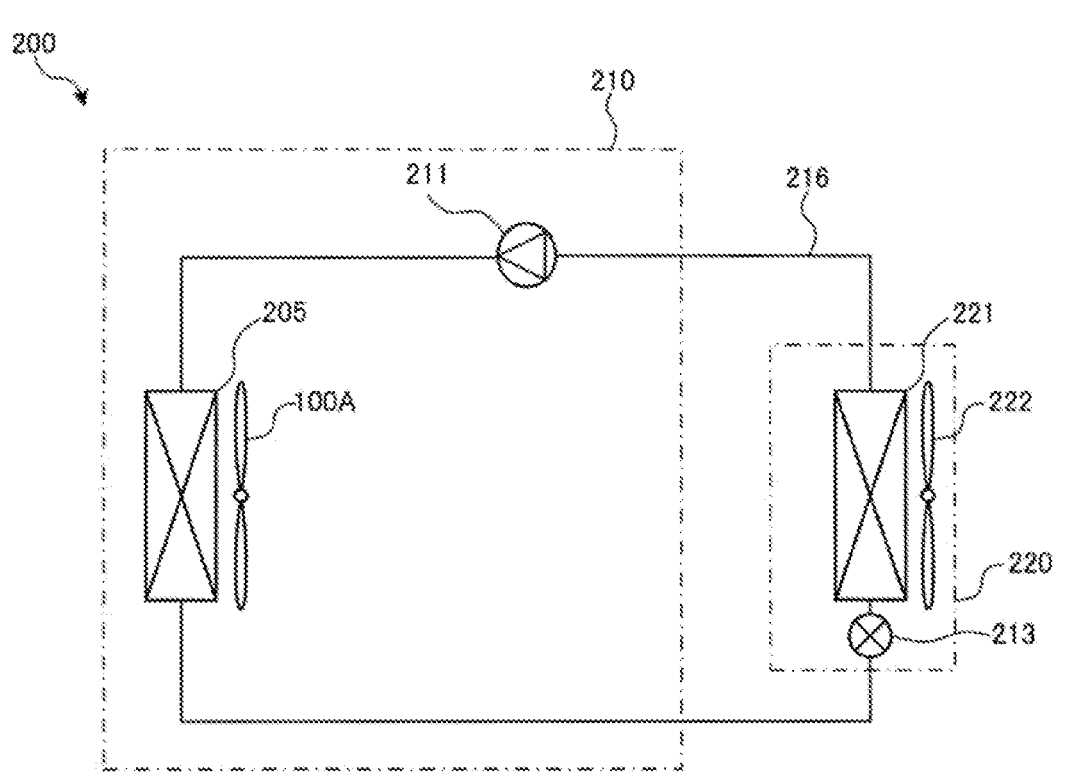
FIG. 13 is a circuit configuration diagram that schematically shows a refrigerant circuit configuration of a refrigeration cycle device according to Embodiment 5 of the present invention.
Figure 14:
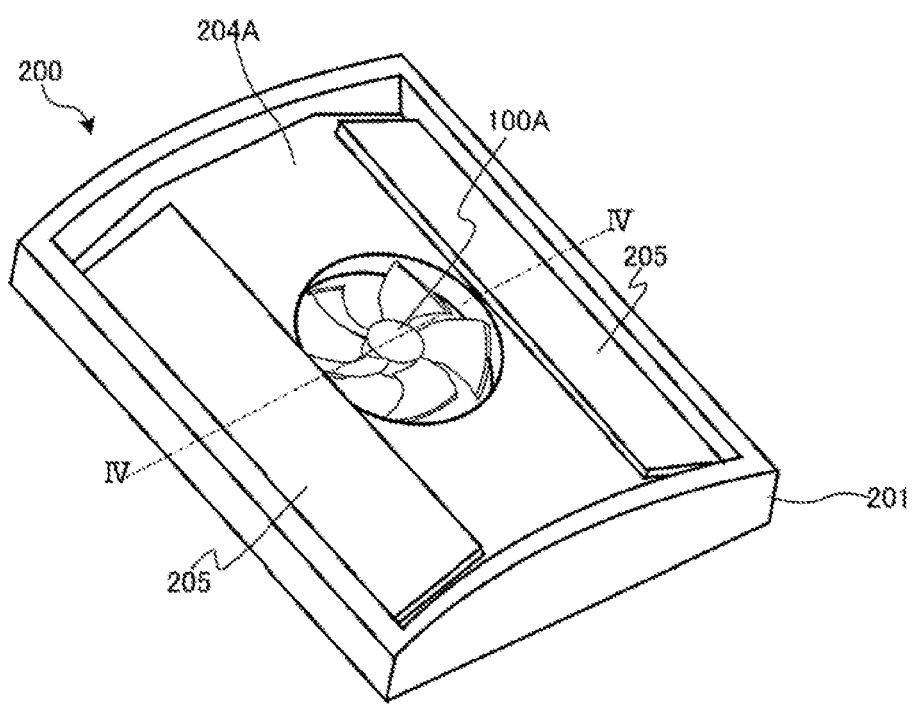
FIG. 14 is a schematic perspective view that schematically shows an example of the configuration of a cooling unit that is a part of the refrigeration cycle device according to Embodiment 5 of the present invention.
Figure 15:
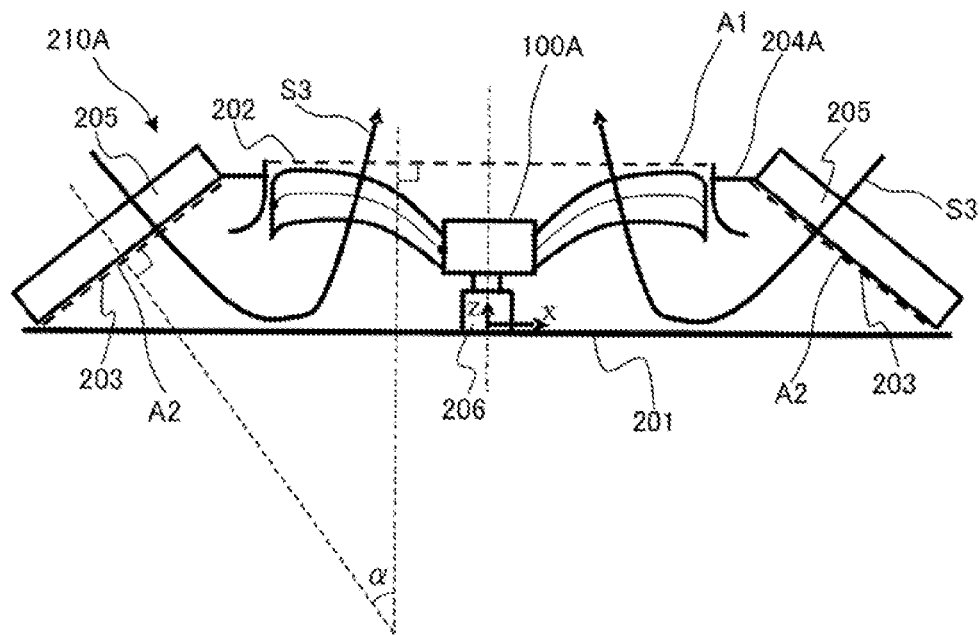
FIG. 15 is a cross-sectional view of the cooling unit, taken along the line IV-IV in FIG. 14.
Figure 16:
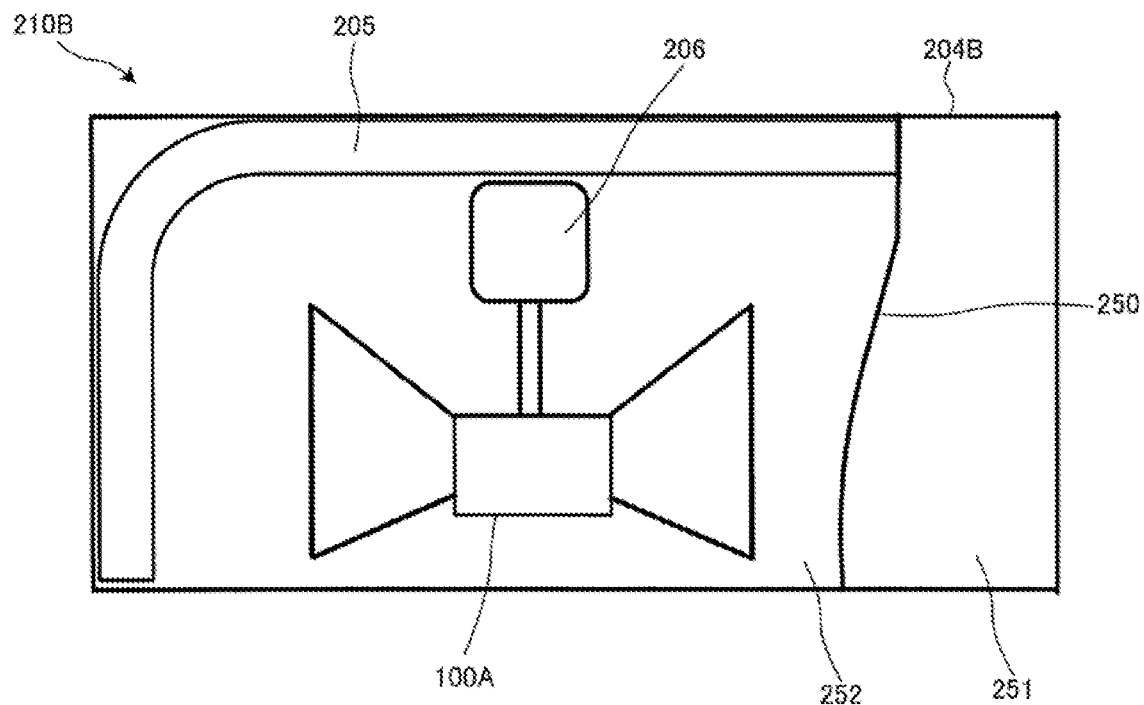
FIG. 16 is a schematic configuration view that schematically shows another part of the configuration of the cooling unit that is a part of the refrigeration cycle device according to Embodiment 5 of the present invention.

FIG. 13 is a circuit configuration diagram that schematically shows a refrigerant circuit configuration of a refrigeration cycle device 200 according to Embodiment 5 of the present invention. FIG. 14 is a schematic perspective view that schematically shows an example of the configuration of a cooling unit 210 that is a part of the refrigeration cycle device 200 (hereinafter, referred to as cooling unit 210A). FIG. 15 is a cross-sectional view of the cooling unit 210A, taken along the line IV-IV in FIG. 14. FIG. 16 is a schematic configuration diagram that schematically shows another example of the configuration of a cooling unit 210 that is a part of the refrigeration cycle device 200 (hereinafter, referred to as cooling unit 210B). The refrigeration cycle device 200 will be described with reference to FIG. 13 to FIG. 16.

<Refrigerant Circuit Configuration of Refrigeration Cycle Device 200>

The refrigeration cycle device 200 is used to operate a vapor compression refrigeration cycle. The refrigeration cycle device 200 is configured such that the propeller fan according to Embodiment 1, Embodiment 2, Embodiment 3, or Embodiment 4 is provided in the cooling unit 210 (the cooling unit 210A or the cooling unit 210B). In Embodiment 5, the case where the propeller fan 100A according to Embodiment 1 is provided will be described as an example.

The refrigeration cycle device 200 includes a compressor 211, a first heat exchanger 205, an expansion device 213, and a second heat exchanger 221.

In the refrigeration cycle device 200, a refrigerant circuit is formed by connecting the compressor 211, the first heat exchanger 205, the expansion device 213, and the second heat exchanger 221 by refrigerant pipes 216.

(Compressor 211)

The compressor 211 compresses refrigerant into high temperature and high pressure, and discharges the refrigerant. The compressor 211 may be, for example, an inverter compressor, or other compressors. For example, a rotary compressor, a scroll compressor, a screw compressor, a reciprocating compressor, or another compressor, may be employed as the compressor 211.

(First Heat Exchanger 205) The first heat exchanger 205 performs the function of a condenser (radiator). The first heat exchanger 205 condenses refrigerant, discharged from the compressor 211, into high-pressure liquid refrigerant. The upstream of the first heat exchanger 205 is connected to the compressor 211, and the downstream of the first heat exchanger 205 is connected to the expansion device 213. The first heat exchanger 205 may be, for example, a fin and tube heat exchanger, or other heat exchangers. The propeller fan 100A is provided together with the first heat exchanger 205. The propeller fan 100A supplies air to the first heat exchanger 205.

(Expansion Device 213) The expansion device 213 expands refrigerant passing through the first heat exchanger 205 to decompress the refrigerant. The expansion device 213 is preferably, for example, an electric expansion valve that is adjustable in opening degree and that is able to adjust the flow rate of refrigerant, or other valves. The expansion device 213 is not limited to the electric expansion valve. A mechanical expansion valve that employs a diaphragm for a pressure receiving portion, a capillary tube, or other devices, may be applied as the expansion device 213. The upstream of the expansion device 213 is connected to the first heat exchanger 205, and the downstream of the expansion device 213 is connected to the second heat exchanger 221.

(Second Heat Exchanger 221) The second heat exchanger 221 performs the function of an evaporator. The second heat exchanger 221 evaporates refrigerant, decompressed by the expansion device 213, into gaseous refrigerant. The upstream of the second heat exchanger 221 is connected to the expansion device 213, and the downstream of the second heat exchanger 221 is connected to the compressor 211. The second heat exchanger 221 may be, for example, a fin and tube heat exchanger, or other heat exchangers. A fan 222, such as a propeller fan, is provided together with the second heat exchanger 221. The fan 222 supplies air to the second heat exchanger 221.

(Cooling Unit 210) The compressor 211, the first heat exchanger 205, and the propeller fan 100A are installed in the cooling unit 210.

(Use-side Unit 220) The expansion device 213, the second heat exchanger 221, and the fan 222 are installed in a use-side unit 220. The expansion device 213 may be installed not in the use-side unit 220 but in the cooling unit 210.

(Others) By providing a flow passage switching device for switching a refrigerant flow passage at a discharge side of the compressor 211, the first heat exchanger 205 may be configured to perform the function of an evaporator and the second heat exchanger 221 may be configured to perform the function of a condenser.

The flow passage switching device may be, for example, a four-way valve, a combination of two two-way valves, or a combination of two three-way valves.

<Operation of Refrigeration Cycle Device 200>

Next, the operation of the refrigeration cycle device 200 will be described in conjunction with flow of refrigerant.

By driving the compressor 211, high-temperature high-pressure gaseous refrigerant is discharged from the compressor 211. The high-temperature high-pressure gaseous refrigerant discharged from the compressor 211 flows into the first heat exchanger 205. In the first heat exchanger 205, heat is exchanged between the high-temperature high-pressure gaseous refrigerant flowed into the first heat exchanger 205 and air that is supplied by the propeller fan 100A, and the high-temperature high-pressure gaseous refrigerant condenses into high-pressure liquid refrigerant.

The high-pressure liquid refrigerant sent out from the first heat exchanger 205 becomes two-phase refrigerant, that is, low-pressure gaseous refrigerant and liquid refrigerant, by the expansion device 213. The two-phase refrigerant flows into the second heat exchanger 221. In the second heat exchanger 221, heat is exchanged between the two-phase refrigerant flowed into the second heat exchanger 221 and air that is supplied by the fan 222, and the liquid refrigerant within the two-phase refrigerant evaporates into low-pressure gaseous refrigerant. The low-pressure gaseous refrigerant sent from the second heat exchanger 221 flows into the compressor 211, the low-pressure gaseous refrigerant is compressed into high-temperature high-pressure gaseous refrigerant, and then the high-temperature high-pressure gaseous refrigerant is discharged from the compressor 211. After that, this cycle is repeated.

<Cooling Unit 210A>

As shown in FIG. 14 and FIG. 15, the cooling unit 210A is intended to be mounted on a vehicle, such as an electric train. The cooling unit 210A includes a base 201, the propeller fan 100A, a casing 204A, a motor 206, and the first heat exchangers 205.

The base 201 constitutes the bottom (surface for installing the motor 206) and sides of the cooling unit 210A.

The casing 204A is provided on the base 201 so as to surround at least the propeller fan 100A. The casing 204A has a discharge portion 202 and suction portions 203.

Where a z-axis is set such that an upward side in the direction of the normal to the base 201 is positive and an x-axis is set in a direction perpendicular to the z-axis, the discharge portion 202 is provided within a z-axis plane under the condition that z>0. That is, an opening above the propeller fan 100A performs the function of the discharge portion 202 that is an air outlet port.

The suction portions 203 are provided on the base 201 so as to be opposed to each other in the x-axis direction. That is, openings in positions in which the first heat exchangers 205 are located perform the function of the suction portions 203 that are air inlet ports.

The first heat exchangers 205 exchange heat between refrigerant flowing through the refrigerant pipes (not shown) and air that is supplied by the propeller fan 100A. The pair of first heat exchangers 205 is provided on the casing 204A in proximity to the suction portions 203.

The propeller fan 100A is located upstream of the discharge portion 202 in the casing 204A on the z-axis such that air flow is discharged toward the positive side of the z-axis. Specifically, the propeller fan 100A is preferably provided directly below the discharge portion 202. The propeller fan 100A takes air into the casing 204A via the suction portions 203, and discharges air from the inside of the casing 204A to the outside via the discharge portion 202.

The motor 206 supports the propeller fan 100A, and drives the propeller fan 100A.

As shown in FIG. 15, in the cooling unit 210A, an angle (an angle α shown in FIG. 15) formed by the normal to a discharge plane (a discharge plane A1 shown in FIG. 15) of the discharge portion 202 and the normal to any one of suction planes (suction planes A2 shown in FIG. 15) of the suction portions 203 is an acute angle. Therefore, in the cooling unit 210A, flow of air inside the base 201 forms a substantially V shape (a substantially V shape or a substantially U shape) (air flow S3 indicated by the arrows in FIG. 15). The discharge plane A1 and the suction planes A2 are imaginary planes.

In the thus configured cooling unit 210A, since flow of air in an air passage inside the casing 204A forms a substantially V shape (a substantially V shape or a substantially U shape), flow of air is complex, and turbulence of flow increases. For this reason, the effect of reducing turbulence resulting from the airfoil shape in the cross section of each blade 2A of the propeller fan 100A is remarkably obtained.

That is, as shown in FIG. 5 of Embodiment 1, since the blade chord center line 27 is a curve having a convex on a downstream side in the entire region in the radial direction, air flow S2 blowing out from each blade 2A spreads in the radial direction. This reduces stagnation of flow downstream of the boss 1 to reduce the boss downstream vortex V1, and the outer peripheral end 22 of each blade 2A has a shape along flow causing the blade tip vortex V2, so it is possible to reduce fluctuations in vortex by stabilizing the blade tip vortex V2. Thus, the effect of reducing turbulence resulting from the airfoil shape in the cross-sectional shape of each blade 2A is maximally exercised further remarkably, so noise is reduced.

<Cooling Unit 210B>

As shown in FIG. 16, a cooling unit 210B is intended to be used as a heat source-side unit (outdoor unit). The cooling unit 210B includes a casing 204B, the propeller fan 100A, the motor 206, the first heat exchanger 205, the compressor 211 shown in FIG. 13, and other devices. The casing 204B constitutes an outer housing. The propeller fan 100A is installed inside the casing 204B. The motor 206 is installed inside the casing 204B. The first heat exchanger 205 is installed inside the casing 204B.

The casing 204B is formed into a box shape, and air inlets are provided at at least two faces (for example, a side face and a back face). A separator 250 is provided inside the casing 204B. An air-sending device chamber 252 in which the propeller fan 100A is installed and a machine chamber 251 in which the compressor 211, and other devices, are installed are partitioned by the separator 250.

The first heat exchanger 205 is formed in an L shape in top plan view so as to be located on the side face and back face corresponding to the air inlets of the casing 2046.

An opening through which air flows is perforated at a front face of the casing 2046.

The propeller fan 100A is driven for rotation by the motor 206 that is installed inside the casing 204B.

With the thus configured cooling unit 210B as well, as shown in FIG. 5 of Embodiment 1, since the blade chord center line 27 is a downstream convex curve in the entire region in the radial direction, air flow S2 blowing out from each blade 2A spreads in the radial direction. This reduces stagnation of flow downstream of the boss 1 to reduce the boss downstream vortex V1, and the outer peripheral end 22 of each blade 2A has a shape along flow causing the blade tip vortex V2, so it is possible to reduce fluctuations in vortex by stabilizing the blade tip vortex V2. Thus, the effect of reducing turbulence resulting from the airfoil shape in the cross-sectional shape of each blade 2A is maximally exercised further remarkably, so noise can be reduced.

REFERENCE SIGNS LIST 1 boss 1X boss 2A blade 2B blade 2C blade 2D blade 2X blade 21 inner peripheral end 21X inner peripheral end 22 outer peripheral end 22X outer peripheral end 23 leading edge 24 trailing edge 25 camber line 26 blade chord center point 26X blade chord center point 27 blade chord center line 27X blade chord center line 28 rounded portion 29 thin-walled portion 100A propeller fan 100B propeller fan 100C propeller fan 100D propeller fan 100X propeller fan 200 refrigeration cycle device 201 base 202 discharge portion 203 suction portion 204A casing 204B casing 205 first heat exchanger 206 motor 210 cooling unit 210A cooling unit 210B cooling unit 211 compressor 213 expansion device 216 refrigerant pipe 220 use-side unit 221 second heat exchanger 222 fan 250 separator 251 machine chamber 252 air-sending device chamber A1 discharge plane A2 suction plane R1 first region R2 second region RC axis S1 air flow S2 air flow S3 air flow V1 boss downstream vortex V2 blade tip vortex V3 trailing edge release vortex

The invention claimed is:

1. A propeller fan comprising:
a boss that rotates about an axis; and
a blade provided at an outer periphery of the boss, wherein:
in a radial direction, the blade has a first region, the first region being a region in which a blade chord center line bends downstream away from an inner peripheral end of the blade, and has a second region in which the blade chord center line bends upstream away from an end of the first region and toward an outer peripheral end of the blade, wherein the upstream and downstream is in view of air sending flow generated by a rotation of the blade,
in an axial cross section, viewed along a radial direction of the blade, a cross-sectional shape of the blade in the first region is an airfoil shape and a cross-sectional shape of the blade in the second region is a circular arc shape having substantially constant thickness from a leading edge toward a trailing edge,
when viewing a cross section taken along the blade chord center line and projected onto a plane including the axis, the blade chord center line is a curve having a convex toward a downstream side in an entire region in the radial direction, and
a boundary between the first region and the second region is set to a middle portion of the blade.

2. The propeller fan of claim 1,
wherein a rounded portion is provided at a downstream end of the blade at the outer peripheral end.

3. A refrigeration cycle device comprising:
a refrigerant circuit in which a compressor, a first heat exchanger, an expansion device, and a second heat exchanger are connected by pipes,
the propeller fan of claim 1, and
a cooling unit,
wherein the propeller fan is installed in the cooling unit in conjunction with the first heat exchanger, and supplies air to the first heat exchanger.

4. The refrigeration cycle device of claim 3,
wherein the cooling unit includes a casing, the casing having a discharge portion and a suction portion, and the propeller fan is provided upstream of the discharge portion, and
wherein an angle ($\alpha$) formed by a normal to a discharge plane of the discharge portion and a normal to a suction plane of the suction portion is an acute angle.

5. The refrigeration cycle device of claim 4,
wherein the cooling unit is mounted on a vehicle.

6. A propeller fan comprising:
a boss that rotates about an axis; and
a blade provided at an outer periphery of the boss, wherein:
in a radial direction, the blade has a first region, the first region being a region in which a blade chord center line bends downstream away from an inner peripheral end of the blade, and has a second region in which the blade chord center line bends upstream away from an end of the first region and toward an outer peripheral end of the blade, wherein the upstream and downstream is in view of air sending flow generated by a rotation of the blade,
in an axial cross section, viewed along a radial direction of the blade, a cross-sectional shape of the blade in the first region is an airfoil shape and a cross-sectional shape of the blade in the second region is a circular arc shape having a thin-walled portion at a trailing edge of the blade,
when viewing a cross section taken along the blade chord center line and projected onto a plane including the axis, the blade chord center line is a curve having a convex toward a downstream side in an entire region in the radial direction, and
a boundary between the first region and the second region is set to a middle portion of the blade.

* * * * *